(12) United States Patent
Bohr et al.

(10) Patent No.: US 9,945,309 B2
(45) Date of Patent: Apr. 17, 2018

(54) VEHICLE METHOD FOR BAROMETRIC PRESSURE IDENTIFICATION

(71) Applicant: Ford Global Technologies, LLC, Dearborn, MI (US)

(72) Inventors: Scott A. Bohr, Novi, MI (US); Russell Randall Pearce, Ann Arbor, MI (US); Mark W. Peters, Wolverine Lake, MI (US); Robert Roy Jentz, Westland, MI (US); Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 44 days.

(21) Appl. No.: 15/145,656

(22) Filed: May 3, 2016

(65) Prior Publication Data

US 2016/0245200 A1   Aug. 25, 2016

Related U.S. Application Data

(63) Continuation of application No. 13/657,461, filed on Oct. 22, 2012, now Pat. No. 9,328,678.

(51) Int. Cl.
*B60T 7/12* (2006.01)
*F02D 41/00* (2006.01)
*B60W 20/00* (2016.01)
*F02M 25/08* (2006.01)

(52) U.S. Cl.
CPC ......... *F02D 41/0037* (2013.01); *B60W 20/00* (2013.01); *F02M 25/0854* (2013.01); *B60W 2550/12* (2013.01); *B60W 2710/0616* (2013.01); *F02N 2200/121* (2013.01); *F02N 2200/122* (2013.01); *Y10S 903/904* (2013.01)

(58) Field of Classification Search
CPC .......... F02D 41/1495; F02D 2041/224; F02D 41/22; F02M 21/0293; F02M 2200/18
USPC ........ 701/101, 107, 114; 123/434, 435, 677, 123/465, 462, FOR. 107, FOR. 120
See application file for complete search history.

(56) References Cited

U.S. PATENT DOCUMENTS

| | | | |
|---|---|---|---|
| 6,378,505 | B1 | 4/2002 | Doering et al. |
| 6,422,214 | B1 | 7/2002 | Sealy et al. |
| 7,444,234 | B2 | 10/2008 | Bauerle |
| 8,150,605 | B2 | 4/2012 | Doering et al. |
| 8,200,411 | B2 | 6/2012 | DeBastos et al. |
| 2003/0029233 | A1 | 2/2003 | Ting et al. |

(Continued)

OTHER PUBLICATIONS

Anonymous, "Perform the OBD Fuel System Leak Test upon Initial Engine Cold Start," IPCOM No. 000240879, Published Mar. 9, 2015, 2 pages.

*Primary Examiner* — John Kwon
(74) *Attorney, Agent, or Firm* — Julia Voutyras; McCoy Russell LLP

(57) ABSTRACT

A vehicle method for barometric pressure identification, including adjusting engine operation responsive to barometric pressure, the barometric pressure based on a pressure change at a sector of the fuel system when the sector is sealed with the vehicle travelling. The method may utilize a pressure change at the sealed sector of the fuel system, such as a sealed fuel tank, to identify barometric pressure, even with the engine off for extended durations of vehicle travel. As such, in a hybrid-vehicle application, including during hill descents in which the engine is maintained off, barometric pressure can still be updated.

19 Claims, 6 Drawing Sheets

(56) References Cited

U.S. PATENT DOCUMENTS

| | | |
|---|---|---|
| 2005/0197794 A1* | 9/2005 | Full .................... G01N 21/274 |
| | | 702/100 |
| 2007/0295067 A1 | 12/2007 | Rollinger et al. |
| 2008/0041645 A1 | 2/2008 | Bauerle |
| 2010/0307464 A1 | 12/2010 | Schondorf et al. |
| 2014/0114550 A1* | 4/2014 | Bohr .................. F02D 41/0037 |
| | | 701/102 |
| 2015/0101327 A1* | 4/2015 | Clark ................. F02D 41/0052 |
| | | 60/599 |
| 2017/0101002 A1* | 4/2017 | Dudar ................... B60K 15/03 |

* cited by examiner

VEHICLE METHOD FOR BAROMETRIC PRESSURE IDENTIFICATION

CROSS REFERENCE TO RELATED APPLICATIONS

The present application is a continuation of U.S. patent application Ser. No. 13/657,461, entitled "VEHICLE METHOD FOR BAROMETRIC PRESSURE IDENTIFICATION," filed on Oct. 22, 2012, now U.S. Pat. No. 9,328,678, the entire contents of which are hereby incorporated by reference for all purposes.

BACKGROUND AND SUMMARY

An accurate assessment of barometric pressure (BP) may be beneficial for improved operation of a vehicle. For example, diagnostic functions and engine strategies benefit from having an estimate of barometric pressure.

One approach to infer BP from existing sensors on the vehicle equates intake manifold pressure, if available, with barometric pressure during engine stopped conditions. In another example, correlations between throttle position, engine mass-airflow, and barometric pressure can be utilized in cooperation with engine breathing data.

The inventors herein have recognized various issues with such approaches, particularly in the context of a hybrid-electric vehicle. For example, the vehicle may operate for extended periods in an engine-off mode, yet without a manifold pressure sensor, and thus accurate estimates of barometric pressure are unavailable. This problem is exacerbated if the vehicle is descending a hill, as the engine is likely to be off for a majority of such a descent. Further, even when operating, the operating conditions may be ones that correlate only loosely with BP, thus providing low accuracy due to the particular speeds and loads at which the engine operates in a hybrid-electric vehicle.

Such issues may be addressed, in one example, by a vehicle method, comprising: adjusting engine operation responsive to barometric pressure, the barometric pressure based on a pressure change in a sector of the fuel system when the sector is sealed with the vehicle travelling. The pressure change in the sector of the fuel system may be a gauge pressure inside the sealed sector measured by a gauge pressure sensor. In this way, it is possible to utilize a pressure change at the sealed sector of the fuel system, such as a sealed fuel tank, to identify barometric pressure, even with the engine off for extended durations of vehicle travel. In one particular embodiment, the fuel tank acts as a sealed vessel and the external pressure change can be identified by the change in the gauge (relative) pressure inside the fuel tank, since the fuel tank itself is sealed. As such, in a hybrid-vehicle application, during hill descents in which the engine is maintained off, barometric pressure can still be updated. Additionally, during high climbing, the engine is operated and the fuel tank may be unsealed, yet again barometric pressure can be identified through the engine mapping via mass air-flow and throttle position, for example.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above of in any part of this disclosure.

BRIEF DESCRIPTIONS OF THE DRAWINGS

DETAILED DESCRIPTION

Figure 1:
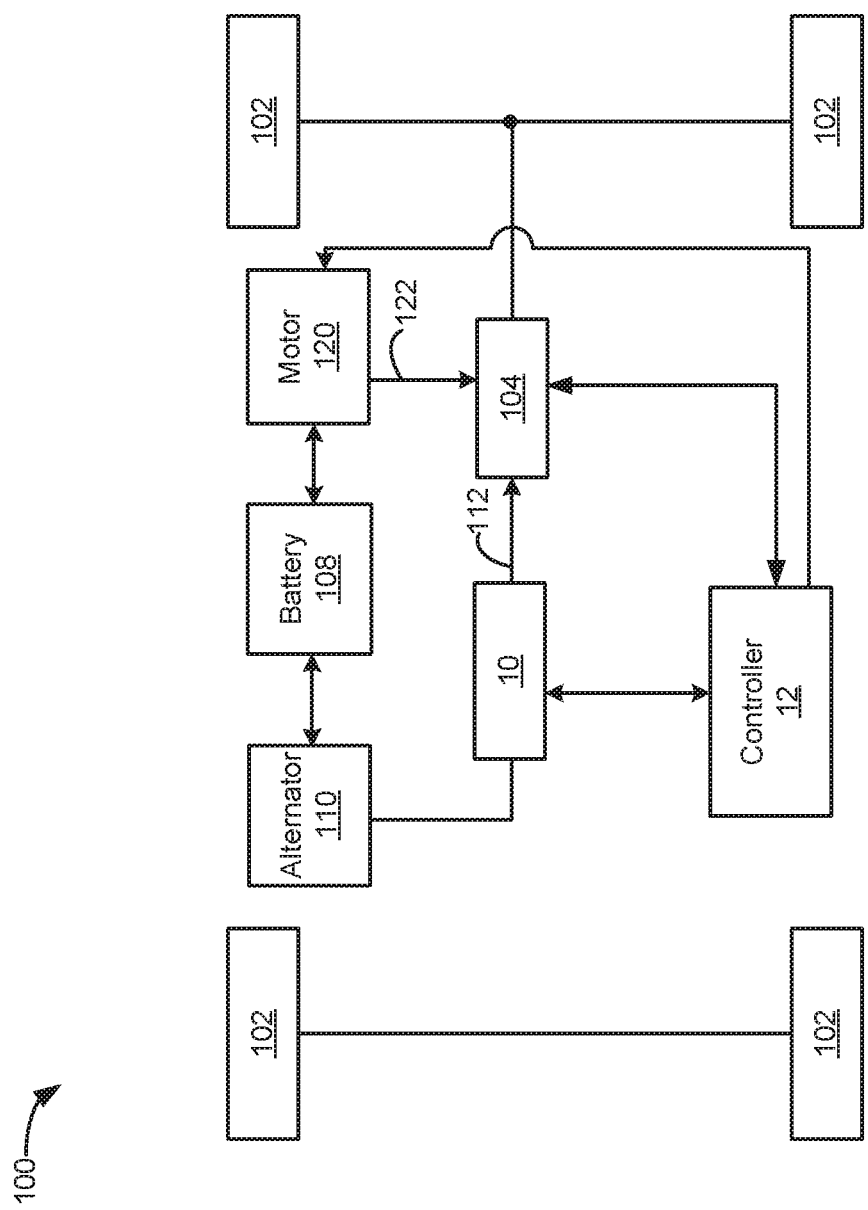
FIG. 1 is a schematic diagram of a hybrid vehicle propulsion system of the present disclosure.
Figure 2:
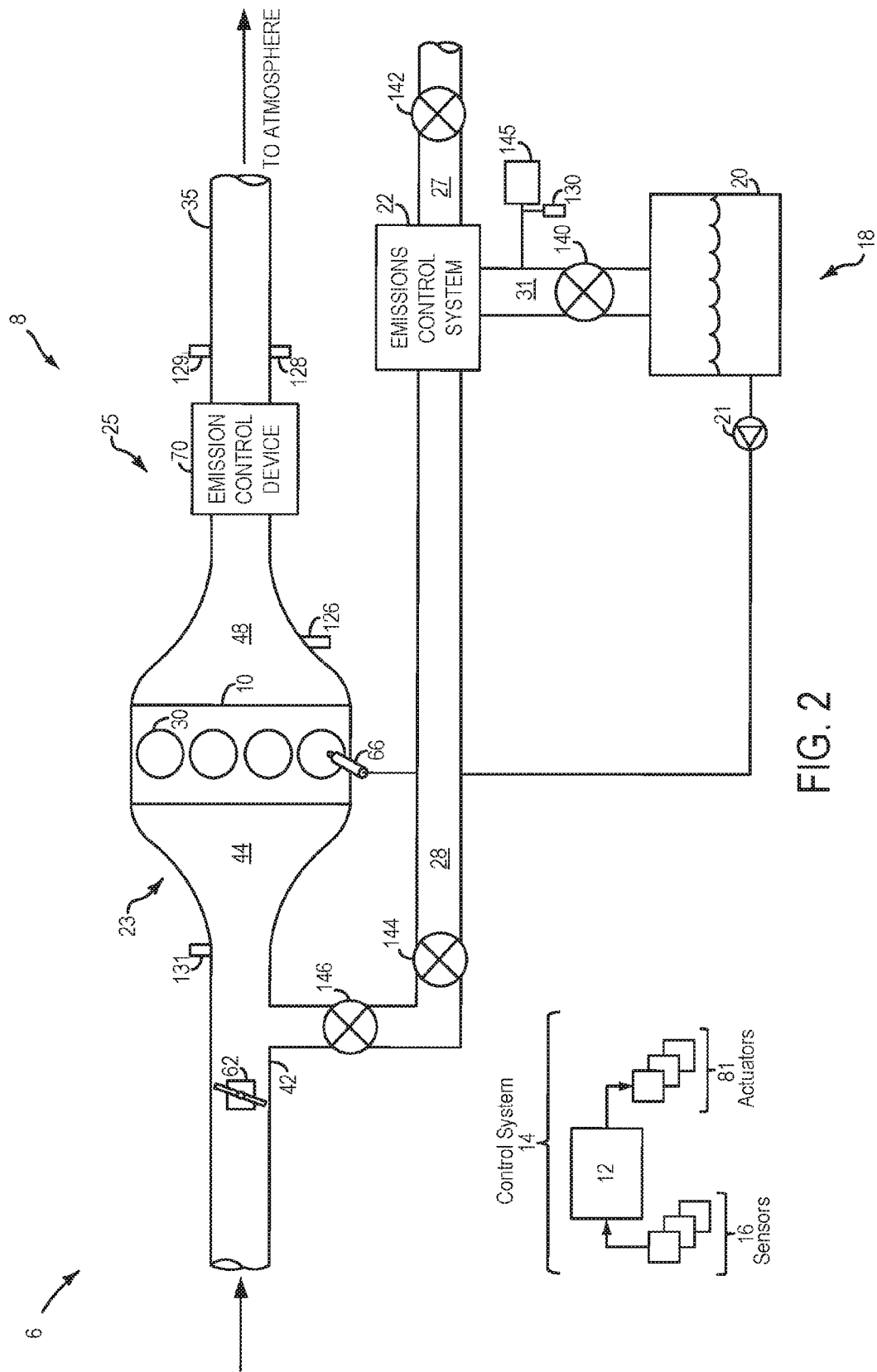
FIG. 2 is a schematic diagram of an exemplary embodiment of a fuel system and fuel vapor recovery system of FIG. 1.
Figure 3:
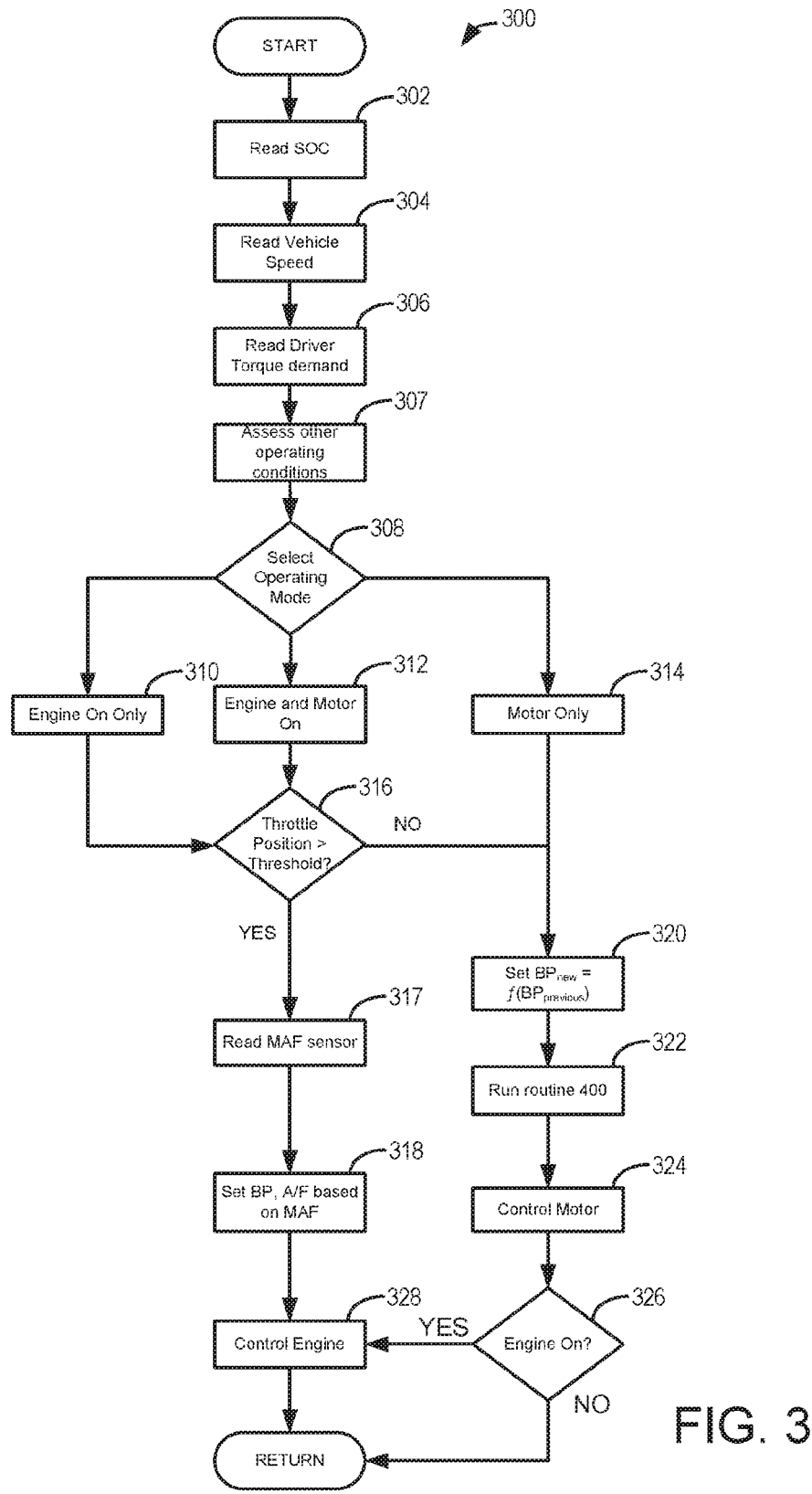
FIG. 3 is a flow diagram that illustrates a routine for controlling a hybrid vehicle propulsion system.
Figure 4:
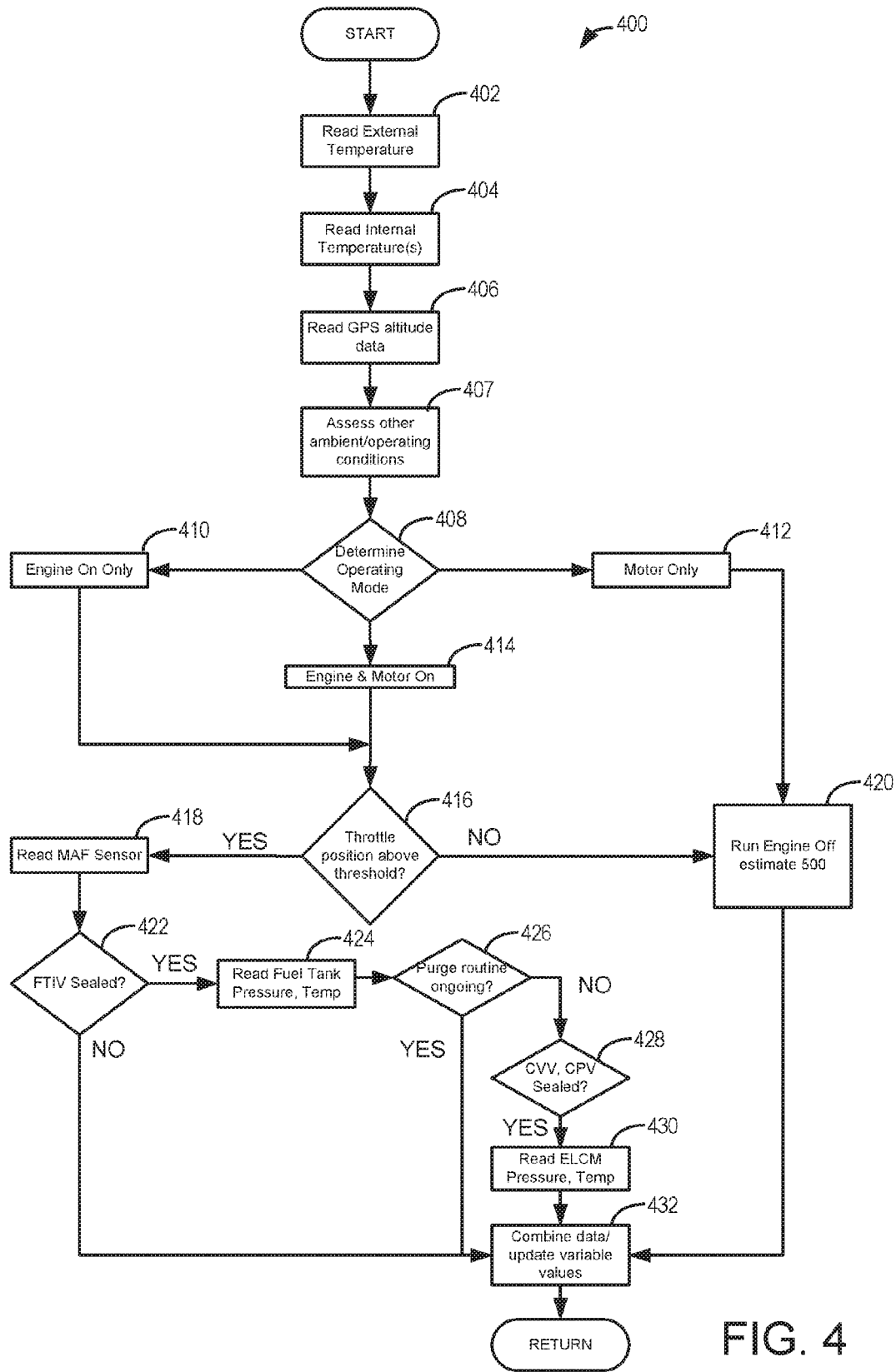
FIG. 4 is a flow diagram that illustrates a routine for determining barometric pressure in a hybrid vehicle.
Figure 5:
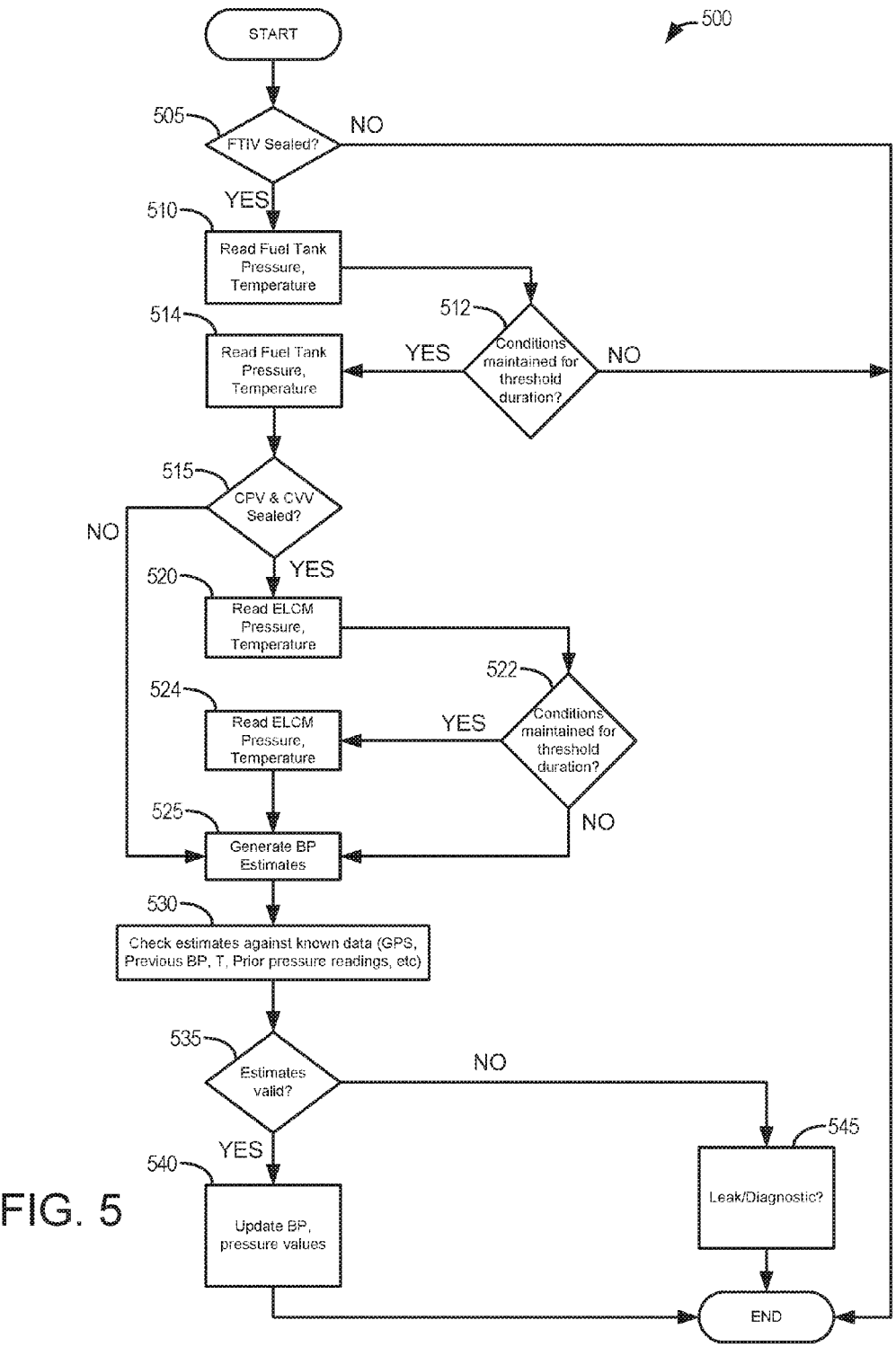
FIG. 5 is a flow diagram that illustrates a sub-routine for inferring barometric pressure in a hybrid vehicle.
Figure 6:
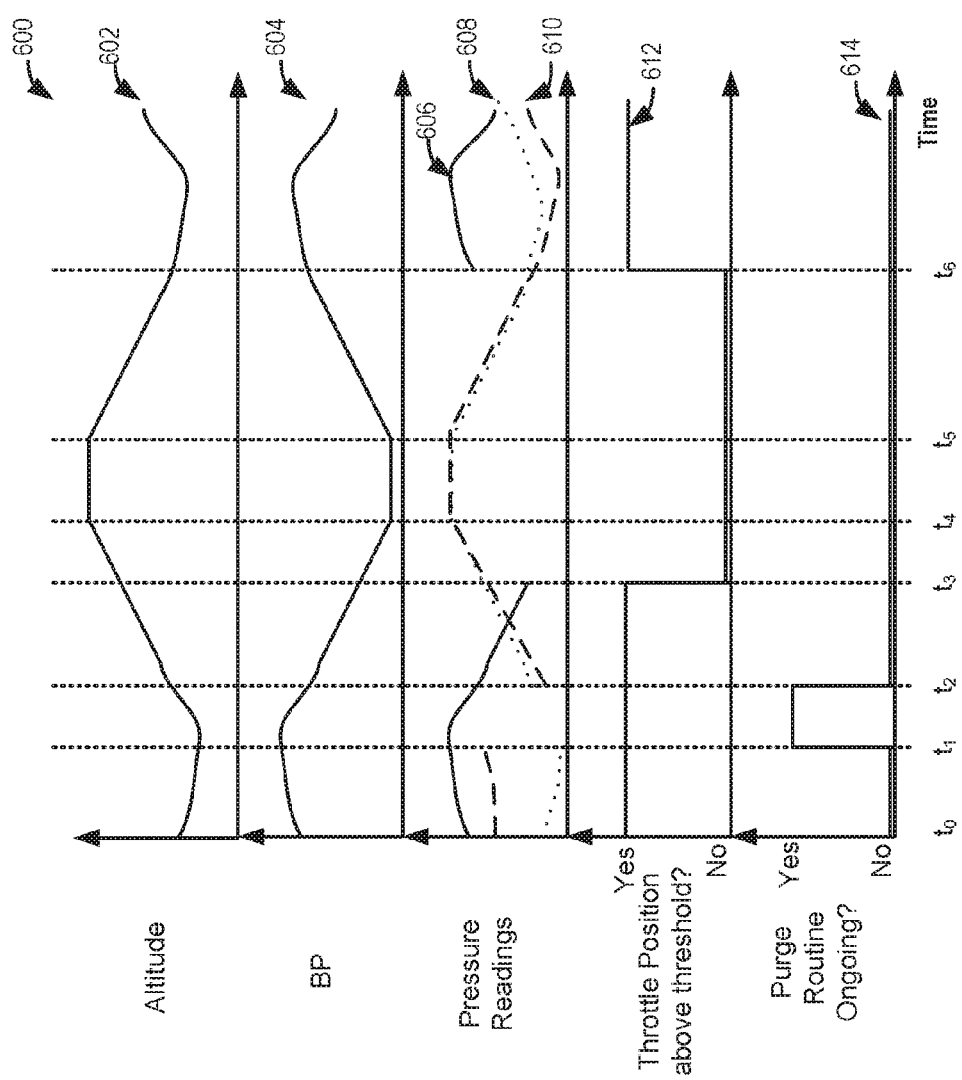
FIG. 6 is a graphical representation of a timeline for vehicle operation and barometric pressure determination.

The following description relates to systems and methods for determining barometric pressure in a vehicle, such as the hybrid vehicle system of FIG. 1. As shown in FIG. 2, the vehicle system may include a fuel vapor recovery system that may include a fuel tank isolated from an engine and/or an emission control system (such as a vapor recovery canister) with a fuel tank isolation valve (FTIV). The emission control system may be coupled to an engine intake by a canister purge valve (CPV) and further coupled to fresh air intake by a canister vent valve (CVV). A controller may receive signals from various sensors including pressure, temperature, fuel level, and global positioning systems, and accordingly regulate actuators including the above mentioned valves, by performing various routines during vehicle operation as illustrated in FIGS. 3-5. By integrating signals from various sensors, the controller may infer external barometric pressure changes through according changes in pressure detected by pressure sensors located in the fuel tank or vapor recovery canister when the surrounding valves are closed and the tank or canister is sealed shut. Example changes in system pressures as detected by various sensors in the fuel system are depicted in the map of FIG. 6. By applying inter-related strategies, accurate barometric pressure measurements may be obtained or inferred during a plurality of vehicle operating conditions, thereby improving engine operating strategies and diagnostic functions.

FIG. 1 illustrates an example vehicle propulsion system 100. Vehicle propulsion system 100 includes a fuel burning engine 10 and a motor 120. As a non-limiting example, engine 10 comprises an internal combustion engine and motor 120 comprises an electric motor. Motor 120 may be configured to utilize or consume a different energy source than engine 10. For example, engine 10 may consume a liquid fuel (e.g. gasoline) to produce an engine output while motor 120 may consume electrical energy to produce a motor output. As such, a vehicle with propulsion system 100 may be referred to as a hybrid electric vehicle (HEV).

Vehicle propulsion system 100 includes wheels 102. Torque is supplied to wheels 102 via engine 10 and transmission 104. In some embodiments, motor 120 may also provide torque to wheels 102.

Vehicle propulsion system 100 may utilize a variety of different operational modes depending on operating conditions encountered by the vehicle propulsion system. Some of these modes may enable engine 10 to be maintained in an off state where combustion of fuel at the engine is discontinued. For example, under select operating conditions, motor 120 may propel the vehicle via transmission 104 as indicated by arrow 122 while engine 10 is deactivated.

During other operating conditions, motor 120 may be operated to charge an energy storage device such as battery 108. For example, motor 120 may receive wheel torque from transmission 104 as indicated by arrow 122 where the motor may convert the kinetic energy of the vehicle to electrical energy for storage at battery 108. Thus, motor 120 can provide a generator function in some embodiments. However, in other embodiments, alternator 110 may instead receive wheel torque from transmission 104, or energy from engine 10, where the alternator 110 may convert the kinetic energy of the vehicle to electrical energy for storage at battery 108.

During still other operating conditions, engine 10 may be operated by combusting fuel received from a fuel system (not shown in FIG. 1). For example, engine 10 may be operated to propel the vehicle via transmission 104 as indicated by arrow 112 while motor 120 is deactivated. During other operating conditions, both engine 10 and motor 120 may each be operated to propel the vehicle via transmission 104 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first drive system and engine 10 may propel the vehicle via a second drive system.

Operation in the various modes described above may be controlled by a controller 12. Controller 12 will be described below in more detail with respect to FIG. 2.

FIG. 2 illustrates an example vehicle system 6 that may include an engine system 8. Engine system 8 may include an engine 10 having a plurality of cylinders 30. Engine 10 includes an engine intake 23 and an engine exhaust 25. Engine intake 23 includes a throttle 62 fluidly coupled to the engine intake manifold 44 via an intake passage 42. Engine exhaust 25 includes an exhaust manifold 48 leading to an exhaust passage 35 that routes exhaust gas to the atmosphere. Engine exhaust 25 may include one or more emission control devices 70 mounted in a close-coupled position. Engine system 8 may be coupled to a fuel system 18. Fuel system 18 may include a fuel tank 20 coupled to a fuel pump system 21 and a fuel vapor recovery system 22. Fuel tank 20 may hold a plurality of fuel blends, including fuel with a range of alcohol concentrations, such as various gasoline-ethanol blends, including E10, E85, gasoline, etc., and combinations thereof. Fuel pump system 21 may include one or more pumps for pressurizing fuel delivered to the injectors of engine 10, such as example injector 66. While only a single injector 66 is shown, additional injectors are provided for each cylinder. It will be appreciated that fuel system 18 may be a return-less fuel system, a return fuel system, or various other types of fuel system. Vapors generated in fuel tank 20 may be routed to fuel vapor recovery system 22, described further below, via conduit 31, before being purged to the engine intake 23.

Fuel vapor recovery system 22 of fuel system 18 may include one or more fuel vapor recovery devices, such as one or more canisters filled with an appropriate adsorbent, for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor recovery system 22 may be purged to engine intake 23 by opening canister purge valve 144.

Fuel vapor recovery system 22 may further include a vent 27 which may route gases out of the recovery system 22 to the atmosphere when storing, or trapping, fuel vapors from fuel tank 20. Vent 27 may also allow fresh air to be drawn into fuel vapor recovery system 22 when purging stored fuel vapors to engine intake 23 via purge line 28 and purge valve 144. A canister check valve 146 may be optionally included in purge line 28 to prevent (boosted) intake manifold pressure from flowing gases into the purge line in the reverse direction. While this example shows vent 27 communicating with fresh, unheated air, various modifications may also be used. A detailed system configuration of fuel system 18 including fuel vapor recovery system 22 is described herein below with regard to FIG. 2, including various additional components that may be included in the intake, and exhaust.

As such, hybrid vehicle system 6 may have reduced engine operation times due to the vehicle being powered by engine system 8 during some conditions, and by the energy storage device under other conditions. While the reduced engine operation times reduce overall carbon emissions from the vehicle, they may also lead to insufficient purging of fuel vapors from the vehicle's emission control system. To address this, fuel tank 20 may be designed to withstand high fuel tank pressures. In particular, a fuel tank isolation valve 140 is included in conduit 31 such that fuel tank 20 is coupled to the canister of fuel vapor recovery system 22 via the valve. Isolation valve 140 may normally be kept closed to limit the amount of fuel vapors absorbed in the canister from the fuel tank. Specifically, the normally closed isolation valve separates storage of refueling vapors from the storage of diurnal vapors, and is opened during refueling to allow refueling vapors to be directed to the canister. As another example, the normally closed isolation valve may be opened during selected purging conditions, such as when the fuel tank pressure is higher than a threshold (e.g., a mechanical pressure limit of the fuel tank above which the fuel tank and other fuel system components may incur mechanical damage), to release refueling vapors into the canister and maintain the fuel tank pressure below pressure limits. The isolation valve 140 may also be closed during leak detection routines to isolate the fuel tank from the engine intake. In one example, when sufficient vacuum is available in the fuel tank 20, an isolation valve may be closed to isolate the fuel tank and a bleed-up rate of the fuel tank vacuum (that is, a rate of decrease in fuel tank vacuum, or rate of increase in fuel tank pressure) may be monitored to identify a leak in the fuel tank.

In some embodiments, isolation valve 140 may be a solenoid valve wherein operation of the valve may be regulated by adjusting a driving signal to (or pulse width of) the dedicated solenoid (not shown). In still other embodiments, fuel tank 20 may also be constructed of material that is able to structurally withstand high fuel tank pressures, such as fuel tank pressures that are higher than a threshold and below atmospheric pressure.

One or more pressure sensors, such as a fuel tank pressure transducer (FTPT) 145, which measures fuel tank pressure relative to ambient pressure (e.g., gauge pressure), may be coupled to the fuel tank, upstream and/or downstream of isolation valve 140, to estimate a fuel tank pressure, or fuel tank vacuum level. Fuel tank 20 may include a temperature sensor 130 to provide an estimate of fuel tank temperature. Temperature sensor 130 may be coupled to FTPT 145 as depicted in FIG. 2 or may be coupled to the fuel tank in a distinct location from FTPT 145. One or more oxygen sensors may be coupled to the canister (e.g., downstream of the canister), or positioned in the engine intake and/or engine exhaust, to provide an estimate of a canister load (that is, an amount of fuel vapors stored in the canister). Based on the canister load, and further based on engine operating conditions, such as engine speed-load conditions, a purge flow rate may be determined.

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, pressure sensor 129, and MAF sensor 131. Other sensors such as additional pressure, temperature, air/fuel ratio, GPS, and composition sensors may be coupled to various locations in the vehicle system 6, as shown in more detail in FIG. 2. As another example, the actuators may include fuel injector 66, isolation valve 140, purge valve 144, and throttle 62. The control system 14 may include a controller 12. The controller may receive input data from the various sensors, process the input data, and trigger the actuators in response to the processed input data based on instruction or code programmed therein corresponding to one or more routines. An example control routine is described herein with regard to FIG. 3.

FIG. 3 shows a high-level routine 300 for operating the propulsion system of a hybrid-electric vehicle, such as propulsion system 100 shown in FIG. 1. Routine 300 may be performed at key on and may subsequently be performed repeatedly to provide a determination of the operating mode of the propulsion system. In one example, routine 300 may be used to determine the operating mode of the propulsion system at key on, and may be further used to establish a baseline barometric pressure and set initial values to accurately infer barometric pressure when necessary. Routine 300 may be used to adjust engine operation responsive to barometric pressure, the barometric pressure based on a change in a sector of a fuel system when the sector is sealed with the vehicle traveling.

Routine 300 may begin at 302 where controller 12 assesses the state of charge (SOC) of the battery 108 or another energy storage device that may provide power to the motor 120. The controller may also read other operating parameters of said battery, for example the battery voltage or battery capacity may be read. Next, at 304, controller 12 may read the vehicle speed as determined by the vehicle speed sensor. Next, at 306, controller 12 may read the driver torque demand. The driver torque demand may be a function of the accelerator pedal position determined by a pedal position sensor, and may also be a function of vehicle speed as determined in 304, and may also utilize other measurements by additional on-board sensors 16. At 307, other operating conditions may be read by the controller 12. These may include fuel level, ambient conditions such as temperature and humidity, fuel usage rates, vehicle location as determined through a global positioning system, or other conditions or measurements assessed by additional on-board sensors 16.

Next, at 308, controller 12 may select an operating mode based on the values of the operational parameters assessed in 302-307. For simplicity, three exemplary operating modes are shown, but there may be additional operating modes available depending on the vehicle, propulsion system, fuel system, engine system and other design parameters which may include an alternative or additional fuel source, multiple batteries or other energy storage devices, or the presence or absence of a turbocharger. Routine 300 may move to 310 if it is determined that the engine should be on and the motor should be off. Routine 300 may move to 312 if it is determined that both the engine and motor should be on. Routine 300 may move to 314 if it is determined that the motor should be on and the engine should be off. In one example embodiment of a vehicle, controller 12 may be able to selectively activate some or all of the cylinders 30. In these example systems, when the engine 10 is on at step 310 or 312 one or more cylinders may be activated and one or more cylinders may be deactivated in accordance with the assessment of operational parameters at 308.

Under conditions where the engine is on (e.g. at step 310 or 312) routine 300 may proceed to 316 to determine the position of throttle 62. Throttle position may be determined with a throttle position sensor or by other on-board sensors. The throttle position may be compared to a preset value or threshold to determine whether the throttle position is above or below said threshold. The threshold may be set at a value equal to or greater than the minimum value to obtain an accurate barometric pressure value using a mass air flow measurement assessed by MAF sensor 131 or other on-board sensors. If the throttle position is determined to be above the threshold value, routine 300 may move to 317. If the value obtained at 316 is below the threshold value routine 300 may move to 320. Routine 300 may also move to 320 if said routine had proceeded to 314 where the operating conditions dictate that the motor is on and the engine is off.

If routine 300 has proceeded to 317, controller 12 may read the mass air flow as assessed by the MAF sensor 131. Next, at 318, controller 12 may generate a first barometric pressure value as a function of the MAF value, the vehicle speed value, the ambient temperature value and the throttle position value. This first BP value may be used to adjust engine controlling parameters such as the desired A/F ratio, spark timing, or desired EGR level, and may update these values at controller 12. The routine may then proceed to 328 where the engine performance and operation is controlled based on the updated values of said parameters.

If routine 300 has proceeded to 320, the BP value may be updated to reflect the most recently obtained or inferred value. The new BP value may be a function of the most recently obtained or inferred value, taking into account additional data as assessed by on-board sensors. At key-on, this may be equal to the last updated value obtained prior to the vehicle being turned off, or another value determined from on-board sensors. In one example, an assessment of vehicle location may be read from a GPS system to determine whether the vehicle location or altitude has changed since the last BP value was obtained, in an example case where the vehicle had been towed or otherwise moved in the time period between key off and key on. In another example, the controller 12 may assess whether the FTIV has remained closed since the last BP value was obtained, and the fuel tank has been sealed from the engine and the ambient environment since the last BP value was obtained. As shown in further detail in FIG. 5, a change in pressure in a sealed fuel tank at constant temperature may be indicative of a change in barometric pressure.

For example, if the FTIV has remained sealed since the last BP reading was taken and if the vehicle's altitude or the ambient weather conditions have changed since the last BP reading was taken, there may be a detectable difference in fuel tank pressure readable by fuel tank pressure sensor 145. The controller may read the current temperature and compare this value to the temperature recorded at the last BP reading. In one example, if the temperature has not changed since the last BP reading, a change in fuel tank pressure may be indicative of a change in BP. In another example, if the temperature has changed, the controller may determine a projected value for the fuel tank pressure based on said temperature change and compare to the actual fuel tank pressure. A difference in these two values may be indicative of a change in BP. This pressure change may be read by controller 12 and used to set a new BP value as a function of the previous BP value, the previous and current fuel tank pressure readings and the previous and current temperature readings.

Routine 300 may then proceed to 322, where sub-routine 400 may be run to obtain a second BP measurement or estimate (see detailed description below and in FIG. 4). This sub-routine may also update the values of parameters that are functions of BP, such as the A/F ratio. Routine 300 may then proceed to 324 where the motor performance and operation is controlled based on the updated values of said parameters. Routine 300 may then proceed to 326. At 326, if the operating mode determined at 308 calls for the engine to be on, the routine may proceed to 328, where the engine performance and operation is controlled based on the updated values of said parameters. Routine 300 may end when engine and motor performance and operation are established.

Turning to FIG. 4, an exemplary embodiment of a barometric pressure determining strategy is shown. Routine 400 may be performed independently or may be performed as a subroutine, for example of routine 300 as shown in FIG. 3 or another similar routine. Routine 400 may be performed repeatedly to allow for an accurate BP measurement or inference to be obtained and updated throughout the operational time of vehicle 6.

Routine 400 may begin at 402 where controller 12 may read the external temperature of the atmosphere surrounding vehicle system 6. External temperature may be assessed by a temperature sensor mounted on the external surface of vehicle 6. Routine 400 may then proceed to 404, where controller 12 may read the internal temperature of the fuel tank, fuel vapor canister 22 or other isolated elements within fuel vapor purge system 8. The internal temperatures may be assessed by fuel tank temperature sensor 130 or other temperature sensors coupled to fuel tank 20, fuel vapor canister 22, or elsewhere within system 8. Next, at 406, controller 12 may obtain information about vehicle location from an on-board GPS. The current vehicle altitude may be assessed, as well as imminent altitude changes based on the projected route or trajectory of vehicle 6. Next, at 407, other operating conditions may be read as measured by on-board sensors. These may include fuel level, ambient conditions such as humidity, additional temperature or pressure values from on-board sensors 16, or other conditions.

Next, at 408, controller 12 may assess the current operating mode of vehicle propulsion system 100. For simplicity, three exemplary operating modes are shown, but there may be additional operating modes available depending on the vehicle, propulsion system, fuel system, engine and other design parameters. Routine 400 may move to 410 if it is determined that the engine is on and the motor is off. Routine 400 may move to 414 if it is determined that both the engine and motor are on. Routine 400 may move to 412 if it is determined that the motor is on and the engine is off.

Under conditions where the engine is determined to be on at step 410 or 414, routine 400 may proceed to 416 to determine the position of throttle 62. Throttle position may be determined with a throttle position sensor or by other on-board sensors. The throttle position may be compared to a preset value or threshold to determine whether the throttle position is above or below said threshold. The threshold may be set at a value equal or greater to the minimum position needed to obtain an accurate barometric pressure value using MAF sensor 131 or other on-board sensors. If the throttle position is determined to be above the threshold value, routine 400 may move to 418. If the value obtained at 416 is below the threshold value routine 400 may move to 420. Routine 400 may also move to 420 if said routine had proceeded to 412 where the motor is on and the engine is off. At step 420 routine 400 may proceed to sub-routine 500 (as detailed in FIG. 5) to obtain an inferred BP estimate when the throttle is closed or below the threshold value necessary to obtain a measurement using MAF sensor 131.

If routine 400 has proceeded to step 418, controller 12 may read MAF sensor 131 and update the current value of BP. At step 422, controller 12 may determine if the fuel tank is isolated by assessing whether FTIV 140 is sealed. If FTIV is not sealed, routine 400 may proceed to step 432, where controller 12 will update the values and variables obtained in routines 300 and 400. If FTIV 140 is sealed, routine 400 may proceed to step 424 where controller 12 may read a first value of the fuel vapor pressure in the fuel tank as assessed by FTPT 145 or another sensor. The controller may also read a first value of the fuel vapor temperature in the fuel tank as assessed by temperature sensor 130 or another sensor. In one example, these fuel tank pressure and temperature readings may be used in sub-routine 500 in determining an inferred BP if a second fuel tank pressure and temperature reading occurs prior to the next opening of the FTIV. In another example, these fuel tank pressure and temperature readings may be used in routine 300 if said readings represent the last known fuel tank pressure before the vehicle is turned off. In another example, these fuel tank pressure and temperature readings may be used to correlate the current BP to the current fuel tank temperature and pressure to update a model or equation for use in another routine in the future, such as routine 500.

Next, routine 400 may proceed to step 426 to determine if a purging routine is ongoing. If a purging routine is ongoing, routine 400 may proceed to step 432, where controller 12 will update the values and variables obtained in routines 300 and 400. If a purge routine is not ongoing, routine 400 may proceed to step 428 where controller 12 may determine if the ELCM 22 is isolated by assessing whether CPV144 and CVV 142 are sealed. If either valve is not sealed, routine 400 may proceed to step 432, where controller 12 will update the values and parameters obtained in routines 300 and 400. If valves 142 and 144 are sealed, routine 400 may proceed to step 430 where controller 12 may read a first value of the fuel vapor pressure in ELCM 22 as assessed by a pressure sensor and a first fuel vapor temperature in ELCM 22 as assessed by a temperature sensor. In one example, these ELCM pressure and temperature readings may be used in sub-routine 500 in determining an inferred BP if another ELCM pressure and temperature reading occurs prior to the next unsealing of the ELCM. In another example, these ELCM pressure and temperature readings may be used in routine 300 if said readings represent the last known ELCM pressure and temperature before the vehicle is turned off. In another example, these ELCM pressure and temperature readings may be used to correlate the current BP to the current ELCM temperature and pressure to update a model or equation for use in another routine in the future, such as routine 500. Next, routine 400 may proceed to step 432, where controller 12 may update the values and variables obtained in routines 300 and 400. Routine 400 may end or return to the start of the routine after all values have been updated.

Turning to FIG. 5, an exemplary subroutine of a barometric pressure determining strategy is shown. Routine 500 may be performed independently or as a subroutine of routine 400 as shown in FIG. 4. Routine 500 may be performed repeatedly to allow for an accurate BP measurement or inference to be obtained and updated at points where the engine 10 is off and/or the position of throttle 62 is below a predetermined threshold.

Turning to FIG. 5, an exemplary subroutine of a barometric pressure determining strategy is shown. Routine 500 may be performed independently or as a subroutine of routine 400 as shown in FIG. 4. Routine 500 may be performed repeatedly to allow for an accurate BP measurement or inference to be obtained and updated at points where the engine 10 is off and/or the position of throttle 62 is below a predetermined threshold.

Routine 500 may begin at 505 where controller 12 may determine if the fuel tank is isolated by assessing whether FTIV 140 is sealed. If FTIV 140 is not sealed, routine 500 ends. If FTIV 140 is sealed, routine 500 may proceed to 510 where controller 12 may read a first fuel tank pressure as assessed by FTPT 145 or another sensor and a first fuel tank temperature as assessed by fuel tank temperature sensor 130 or another sensor. Next, routine 500 may proceed to 512 where controller 12 may determine whether the conditions necessary for assessing the fuel tank pressure and temperature have been maintained for the duration of a predetermined threshold. The conditions may include the status of the FTIV, if it remains sealed and has been sealed without becoming unsealed since the initial reading at 510. The conditions may also include a threshold temperature change, whereby a change in temperature greater than said threshold may cause routine 500 to end. The predetermined threshold duration may be a predetermined length of time as assessed by an onboard clock or timing mechanism. In another example, the predetermined threshold duration may be a predetermined distance as assessed by the vehicle wheel sensors or other onboard sensors. If the conditions have not been maintained for a predetermined duration, routine 500 may end. If the conditions have been maintained for a predetermined threshold, routine 500 may proceed to 514, where controller 12 may read a second fuel tank pressure as assessed by FTPT 145 or another sensor and a second fuel tank temperature as assessed by fuel tank temperature sensor 130 or another sensor.

Next, routine 500 may proceed to 515, where controller 12 may assess whether valves CPV 144 and CVV 142 are sealed. If either of CPV 144 or CVV 142 is not sealed, routine 500 proceeds to step 525 where the fuel tank pressure and temperature values assessed in steps 510 and 514 may be used in conjunction with other data obtained from onboard sensors during routines 300 and 400 to generate putative BP estimates. If CPV 144 and CPV 142 are sealed, routine 500 may proceed to 520 where controller 12 may read a first fuel vapor pressure in ELCM 22 as assessed by a pressure sensor and a first fuel vapor temperature as assessed by a temperature sensor. Next, routine 500 may proceed to 522 where controller 12 may determine whether the conditions necessary for assessing the fuel vapor pressure and temperature in ELCM 22 have been maintained for the duration of a predetermined threshold. The conditions may include the status of the FTIV, CPV and CVV, if all valves remain sealed and have been sealed without becoming unsealed since the initial reading at 520. The predetermined threshold duration may be a predetermined length of time as assessed by an onboard clock or timing mechanism. In another example, the predetermined threshold duration may be a predetermined distance as assessed by the vehicle wheel sensors or other onboard sensors. If the conditions have not been maintained for a predetermined duration, routine 500 may proceed to 525 where the fuel tank pressure and temperature values assessed in steps 510 and 514 may be used in conjunction with other data obtained from onboard sensors during routines 300 and 400 to generate putative BP estimates. If the conditions have been maintained for a predetermined threshold, routine 500 may proceed to 524, where controller 12 may read a second fuel vapor pressure in ELCM 22 as assessed by a pressure sensor and a second fuel vapor temperature as assessed by a temperature sensor 130 or another sensor.

Next, routine 500 may proceed to 525 and generate a putative BP estimate based on the vapor pressure and temperature readings taken at 510, 514, 520 and 524 along with other data obtained in routines 300 and 400. The change between the first and second pressure readings may be compared to a threshold pressure change to determine validity of the readings. Next, routine 500 may proceed to 530 and evaluate whether the putative BP estimate falls within a plausible range of values based on data obtained in routines 300, 400 and 500. This data may include GPS data, inferred altitude estimates, internal and external temperatures, previous inferred BP values and engine readings, previous pressure readings, other ambient readings and other on-board sensor readings.

Routine 500 may then proceed to step 535. If the putative BP estimates from step 525 are validated in step 530, routine 500 may proceed to step 540, where inferred BP and vapor pressure values are updated, and routine 500 ends. If BP estimates from step 525 are invalidated in step 530, routine 500 may proceed to step 545. In step 545, a leak or other diagnostic test may be performed to determine the source of inaccuracy of the putative BP estimate generated in step 525. When this subroutine is completed, routine 500 ends. In another example, the leak detection routine of step 545 may be performed prior to the validation of the putative BP estimates. The leak detection routine may be performed to detect leaks in the Fuel tank, ELCM, other sealed sector, or any combination thereof. The leak test may factor in previous inferred BP measurements, engine derived BP values, other data obtained in routines 300, 400 and 500, other ambient readings and/or other on-board sensor readings.

Routine 500 takes advantage of the pressure changes that may occur at a sealed sector when the sector is exposed to an external barometric pressure change, such as an altitude change. In a sealed sector at constant temperature, such as a vapor canister or a fuel tank, an increase in external barometric pressure may result in a corresponding decrease in relative pressure (or increase in relative vacuum) in the sealed sector. A decrease in external barometric pressure may result in a corresponding increase in relative pressure in the sealed sector. Under conditions when the MAF reading is not valid to be used for generating an engine breathing based EP estimate (including engine off and throttle below threshold conditions), the pressure readings may be used to infer BP. In one example, given a BP value derived from the MAF reading, a decrease in relative pressure in the sealed sector may be used to calculate an updated BP that is greater than the previous BP. In another example, an increase in pressure in the sealed sector may be used to calculate a BP that is lesser than the previous BP. Taking temperature measurements at the same time as pressure measurements may allow for the calculation of expected pressure in the sealed sector based on the expected increase or decrease of fuel vapor pressure in accordance with the ideal gas law.

Routine 500 shows one example routine for monitoring the pressure of a sealed fuel tank and a sealed ELCM. The redundancy of using two separate sectors of the fuel system may allow for more accurate BP estimates to be inferred than would be possible through the use of one sector. In one example, if both sectors are sealed, the internal pressures of each sealed sector may change at a predictable ratio in accordance with a change in BP. In another example, the internal pressures of each sector may change at independent ratios with a change in BP if there is a leak or other fault in the system.

In example routine 500, a first fuel tank pressure and temperature is assessed and after a predetermined duration in which the fuel tank remains sealed without becoming unsealed a second fuel tank pressure and temperature is assessed. Routine 500 then goes on to assess a first temperature and pressure of the ELCM, and after a predetermined duration in which the ELCM remains sealed without becoming unsealed a second ELCM pressure and temperature is assessed. In another example routine, the first fuel tank pressure and temperature may be assessed at the same time as the first ELCM pressure and temperature, and the second fuel tank pressure and temperature may be assessed at the same time as the second ELCM pressure and temperature. In another example, the first and second ELCM pressures and temperatures may be assessed before the first and second fuel tank pressures.

In yet another example, BP may be inferred solely from one sealed sector of the fuel system. This sector may be the fuel tank, the ELCM or any other sector of the fuel system that can be sealed through the use of valves and is coupled to temperature and pressure sensors. In another example, the fuel tank pressure sensor may be located upstream of the FTIV, requiring the valve to be opened in order to assess the fuel tank pressure. In this example, the ELCM pressure and temperature may be in calculating an inferred BP, and may also be used in calculating an expected fuel tank pressure. The actual fuel tank pressure may then be assessed by the fuel tank pressure sensor at the opening of the FTIV and may be compared to the expected pressure as part of a subroutine used to validate or invalidate the inferred BP estimate.

In another example, the timing of ELCM purging operations may be a factor in the timing of fuel sector pressure measurements. During hybrid vehicle operations, vapor purging may not occur during engine-off periods or during periods when the throttle position is above the threshold for calculating BP based on readings from the MAF sensor. In this example, purging the ELCM may entail opening the CVV and/or the CPV, leaving the controller unable to assess BP through either the MAF sensor or the ELCM pressure and temperature. In one example, the FTIV may be closed during purging routines allowing for the fuel tank pressure and temperature readings to be used to infer BP. In another example, the controller may maintain the closed state of one or more valves to allow for inferred BP to update based on ELCM pressure and temperature prior to beginning a purge routine.

In another example, pressure and temperature values for one or more sealed fuel sectors may be assessed as part of routine 400 or other such routines where the engine is on prior to the engine being turned off or the throttle position falling below threshold or other such conditions that may trigger routine 500 or other such routines. In this example, routine 500 may begin at step 512 or 522 where controller 12 may assess whether conditions including the status of valves have been maintained for a predetermined duration since the previous measurements. If said conditions have been maintained for the duration greater than the threshold, the routine may move to a step or steps where a second fuel sector temperature and pressure are taken.

Taken together, routine 300 and subroutines 400 and 500 or adaptations or equivalents thereof may be utilized by controller 12 throughout the duration of vehicle operation to measure or estimate BP, to adjust operating parameters based on this BP, and to adjust engine and/or motor operation based on these updated operating parameters.

In one example, a hybrid vehicle may select a motor-only operating mode at key-on. This may be due to the initial vehicle speed being zero, the initial driver torque demand being below a threshold for engine operation, the battery SOC being above a threshold for motor-only operation, or any combination of these and other operating conditions. In this example, the BP may not be assessed through the MAF sensor. The BP may be inferred as a function of the last recorded BP at key off and other operating conditions assessed at key on. The controller may assess if the car is in the same location at key-on as it was at key-off through a GPS or other locating device. The controller may assess if the FTIV has remained sealed since key-off. The controller may read the fuel tank temperature and compare to the most recent recorded fuel tank temperature. If the FTIV was sealed at key off and remains sealed at key-on the pressure and temperature readings may be used to accurately estimate the BP from the previous value.

In one example, a vehicle remains in the same location at key-on as it was at key-off, and atmospheric pressure remains the same at key-on as it was at key-off, and the FTIV has remained sealed in the interim. The fuel tank temperature and pressure readings at key off may be used to estimate the amount of fuel in the tank, and estimate a fuel tank pressure based on the measured fuel tank temperature. In this example, the measured fuel tank pressure may approximate the estimated value and validate the inferred BP. In another example, the vehicle may have been towed to a higher altitude while off or the atmospheric pressure may have decreased due to a change in weather conditions. In this example, the measured fuel tank pressure may have increased over the expected pressure. This measured increase may be used to calculate the new BP as a function of the previous BP. In another example, the vehicle may have been towed to a lower altitude while off or the atmospheric pressure may have increased due to a change in weather conditions. In this example, the measured fuel tank pressure may have decreased from the expected pressure. The measured decrease may be used to calculate the new BP as a function of the previous BP.

In another example, the fuel tank may have been opened for refueling or other purposes, causing the FTIV to open or otherwise causing the fuel tank pressure to change. In this example, if the car has not moved or has remained off for the duration of time less than a predetermined threshold, the controller may set the BP equal to the most recently recorded BP at key-off. The controller may update this value using routine 500 or other engine-off estimates until the engine is turned on and the throttle is above threshold, allowing for BP to be measured as a function of the MAF sensor reading. In the absence of contra-indicators or if the FTIV has become unsealed since key-off, the controller may set the BP equal to the most recently recorded BP at key-off. The controller may also read temperature and pressure measurements in the vapor canister if it has remained sealed without becoming unsealed since key-off to confirm or otherwise modify the inferred BP. Significant differences in actual measurements when compared to estimates may indicate a leak or other fault.

In another example, the vehicle may operate for an extended period in the engine-off mode. In this scenario, routine 500 or equivalent may continuously update the inferred BP based on the fuel sector pressure and temperature measurements. This may occur when the vehicle is traveling downhill. In this example, the pressure inside a sealed fuel sector may decrease, indicating an increase in BP that may be calculated by the controller. However, in one scenario, the engine may have been turned off with the fuel tank pressure or fuel canister pressure at or just below the threshold for triggering a purge operation. In this case, a decrease in barometric pressure due to an increase in elevation or change in weather conditions may cause the fuel tank pressure or fuel canister pressure to increase beyond the threshold and indicate a purge operation. In this scenario, the controller may finish an engine-off estimate or otherwise maintain valves in closed states before switching to an engine-on mode to run a purging routine. If the throttle position passes the threshold for an MAF estimate while in engine-on mode, the BP may be updated. If the throttle position does not pass the threshold for an MAF estimate, the BP may be updated using fuel sector pressures and temperatures once the purging routine has completed and the fuel sector is once again sealed.

In another example, a hybrid vehicle may run in an operating state where both the engine and motor are on but the throttle position is below threshold for an MAF estimate for a prolonged period of time. In this case, fuel vapor may accumulate and trigger purging operations during routine 500 or other such engine-off estimates of BP. The controller may maintain valves in closed states in order to obtain an accurate BP inference before allowing a purge routine to ensue.

In another example, a vehicle descending a hill in motor-only mode may estimate or infer BP based on measurements from both the fuel tank and the fuel vapor canister. The estimation model may assume that a decrease in altitude will correlate with an increase in barometric pressure, and this increase in BP will correlate with proportionate decreases in fuel tank pressure and fuel vapor canister pressure. If the measurements do not reflect this model, for example, the fuel tank pressure decreases at a greater rate than the fuel vapor canister pressure, this may be indicative of a leak or faulty valve. The controller may then run a leak detection routine, for example when the engine is on and a vacuum may be applied across the valves in question, or during an extended time when the vehicle is not being operated.

In another example, a vehicle traveling across hilly terrain or through drastically changing weather patterns may register barometric pressure readings that do not correlate with the inference model. In order to prevent unnecessary leak detection routines, the controller may read vehicle location or trajectory data from a GPS or other navigation system to take into account imminent changes of elevation. Likewise, the controller may read information about weather patterns from available satellite or internet information.

FIG. 6 illustrates one possible timeline for vehicle operation. Map 600 depicts trends in altitude 602, BP 604, MAF pressure 606 (depicted as a solid line), fuel tank pressure 608 (depicted as a dotted line), ELCM pressure 610 (depicted as a dashed line), throttle position relative to a predetermined threshold 612, and purge operation status 614. The timeline is approximately to scale. For simplicity, external and internal temperatures are assumed to remain constant throughout the timeline. For simplicity, altitude changes 602 are depicted as having an inverse relationship with BP 604, increased altitude correlates with a decreased barometric pressure. Weather conditions and other external factors that may affect BP are assumed to remain constant throughout the timeline. Additional ambient and operating conditions not shown in FIG. 6 but described or alluded to in routines 300, 400 and 500 may also be assumed to remain constant throughout the timeline unless otherwise noted.

At $t_0$, engine 10 is on, the throttle position is above the predetermined threshold (612), and no purging routine is ongoing (614). Under these conditions, BP may be directly determined from the MAF sensor reading. If FTIV 140 is sealed, fuel tank pressure readings 608 may update. If CVV 142 and CPV 144 are also sealed, ELCM pressure readings 610 may update.

At $t_1$, throttle position remains above threshold (612) and a purge routine begins. From $t_1$ to $t_2$, when the purge routine ends, fuel tank pressure 608 and ELCM pressure 610 will not update. BP may still be determined from the MAF sensor reading until $t_3$, when the throttle position drops below the threshold value. The purge routine may cause the ELCM pressure reading to decrease due to the release of vapor. The release of vapor from the ELCM may allow for the fuel tank to purge vapor to the ELCM through the FTIV. In this example, the fuel tank pressure would also decrease after completion of the purge routine. In another example, the FTIV may remain closed throughout the purging of the ELCM. In this scenario, the fuel tank pressure may continue to update throughout the ELCM purging routine.

At $t_2$ the purging routine has completed. From $t_2$ to $t_3$, the engine is on, the throttle position remains above the threshold value, and the vehicle is ascending a hill. For this duration, the MAF readings may be used to calculate the BP, which is decreasing in accordance with the increase in altitude change. If valves 140, 142 and 144 are sealed for the pre-determined threshold duration, the fuel tank pressure 610 and ELCM pressure 608 may increase accordingly, and those values may update at controller 12. Updating the fuel tank pressure and ELCM pressure readings, even when the BP is being calculated from the MAF sensor reading may allow the inferred BP to have increased accuracy when the throttle position is below the threshold value.

From $t_3$ to $t_6$, the throttle position falls to a position below the threshold value. This may be due to a decrease in driver torque demand, a change in engine operating mode, or change in other operating parameters. For this duration, the MAF value may not update, and the BP may be inferred from the ELCM pressure 610, the fuel tank pressure 608 taking into account other readings from on-board sensors 16.

From $t_3$ to $t_4$, altitude 602 is increasing, which may indicate the vehicle is ascending a hill. This increase in altitude is accompanied by a corresponding decrease in BP 604. If valves 140, 142 and 144 are sealed, the fuel tank pressure 610 and ELCM pressure 608 may increase accordingly. As multiple pressure readings are taken while the valves remained sealed without becoming unsealed, the pressure values may be used to infer the BP taking into account other readings from on-board sensors 16.

From $t_4$ to $t_5$, the altitude 602 remains relatively constant, accompanied by a corresponding relatively constant BP. If valves 140, 142 and 144 are sealed, the fuel tank pressure 610 and ELCM pressure 608 may remain relatively constant accordingly. As multiple pressure readings are taken while the valves remained sealed without becoming unsealed, the pressure values may be used to infer the BP taking into account other readings from on-board sensors 16.

From $t_5$ to $t_6$, the altitude 602 is decreasing, which may indicate the vehicle is descending a hill. The decrease in altitude is accompanied by a corresponding increase in BP 604. If valves 140, 142 and 144 are sealed, the fuel tank pressure 610 and ELCM pressure 608 may decrease accordingly. As multiple pressure readings are taken while the valves remained sealed without becoming unsealed, the pressure values may be used to infer the BP taking into account other readings from on-board sensors 16.

At $t_6$, the throttle position returns to a position greater than the threshold value, and the BP may be determined from the MAF sensor reading. If FTIV 140 is sealed, fuel tank pressure readings 608 may update. If CVV 142 and CPV 144 are also sealed, ELCM pressure readings 610 may update. Updating the fuel tank pressure and ELCM pressure readings, even when the BP is being calculated from the MAF sensor reading may allow the inferred BP to have increased accuracy when the throttle position is below the threshold value.

It will be appreciated that the configurations and routines herein are exemplary in nature, and that these specific embodiments are not to be considered in a limiting sense, because numerous variations are possible. The subject matter of the present disclosure includes all novel and nonobvious combinations and sub-combinations of the various systems and configurations, and other features, functions, and/or properties discussed herein.

The following claims particularly point out certain combinations and sub-combinations regarded as novel and nonobvious. The claims may refer to "an" element or "a first" element or the equivalent thereof. Such claims should be understood to include incorporation of one or more such elements, neither requiring nor excluding two or more such elements. Other combinations and sub-combinations of features, functions, elements, and/or properties may be claimed through amendments of the present claims or through presentation of new claims in this or a related application. Such claims, whether broader, narrower or equal, or different in scope to the original claims, also are regarded as included within the subject matter of the present disclosure.

The invention claimed is:

1. A vehicle method, comprising:
adjusting engine operation responsive to barometric pressure, the barometric pressure determined based on a pressure change in a sector of a fuel system when the sector is sealed with a vehicle travelling, and wherein a leak is indicated in the fuel system based on a ratio of pressure changes in each of the sealed sector and another sealed sector of the fuel system.

2. The method of claim 1, wherein the barometric pressure is further determined based on a pressure change in the another sector of the fuel system when the another sector is sealed with the vehicle traveling.

3. The method of claim 1, wherein the vehicle traveling includes descending a hill with an engine shut off.

4. The method of claim 2, wherein the barometric pressure is further determined based on the pressure change in the another sector of the fuel system when both pressure changes change at a predictable ratio, and the leak is indicated when the ratios change independently.

5. The method of claim 1, wherein the sector of the fuel system is a fuel tank, and the another sector is an evaporative leak check module (ELCM).

6. The method of claim 5, wherein the fuel tank is sealed by closing a fuel tank isolation valve.

7. The method of claim 1, wherein one of the sectors of the fuel system is a fuel vapor canister.

8. The method of claim 7, wherein the fuel vapor canister is sealed by closing a fuel tank isolation valve, a canister purge valve and a canister vent valve.

9. The method of claim 1, wherein the barometric pressure is further based on a temperature change over the pressure change and wherein the barometric pressure is determined when the temperature change is less than a threshold during the pressure change.

10. The method of claim 2, wherein a fuel tank is sealed throughout the pressure change, without becoming unsealed during the pressure change.

11. The method of claim 1, wherein the pressure change is greater than a threshold pressure change.

12. The method of claim 1, wherein the vehicle is a hybrid vehicle.

13. The method of claim 1, wherein the vehicle is a plug-in hybrid-electric vehicle.

14. The method of claim 1, wherein an engine is at rest during the pressure change.

15. The method of claim 1, wherein an engine includes a mass airflow sensor, without a pressure sensor in an intake manifold of the engine.

16. The method of claim 1, wherein the pressure change occurs over a threshold duration traveled by the vehicle, and where engine operation includes engine spark timing and engine air-fuel ratio.

17. The method of claim 16, wherein the threshold duration is a time period.

18. The method of claim 16, wherein the threshold duration is a distance measured by wheel sensors.

19. The method of claim 1, wherein the sector of the fuel system is sealed from an engine and an ambient environment during the pressure change.

* * * * *